(12) United States Patent
Choi et al.

(10) Patent No.: US 10,795,513 B2
(45) Date of Patent: Oct. 6, 2020

(54) CAPACITOR STRUCTURE, DISPLAY DEVICE HAVING CAPACITOR STRUCTURE, AND MANUFACTURING METHOD OF CAPACITOR STRUCTURE

(71) Applicants: Samsung Display Co., Ltd., Yongin-si (KR); Research & Business Foundation SUNGKYUNKWAN UNIVERSITY, Suwon-si (KR)

(72) Inventors: Tae Young Choi, Yongin-si (KR); Nae-Eung Lee, Seoul (KR)

(73) Assignees: Samsung Display Co., Ltd., Yongin-si (KR); Research & Business Foundation SUNGKYUNKWAN UNIV, Suwon-si (KR)

( * ) Notice: Subject to any disclaimer, the term of this patent is extended or adjusted under 35 U.S.C. 154(b) by 64 days.

(21) Appl. No.: 15/869,680

(22) Filed: Jan. 12, 2018

(65) Prior Publication Data
US 2018/0356916 A1    Dec. 13, 2018

(30) Foreign Application Priority Data

Jun. 7, 2017 (KR) .................. 10-2017-0070744

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04102* (2013.01); *G06F 2203/04103* (2013.01); *G06F 2203/04112* (2013.01)

(58) Field of Classification Search
CPC ........ G06F 3/044; G06F 3/0412; G06F 3/016; G06F 3/04886; G06F 3/0416;
(Continued)

(56) References Cited

U.S. PATENT DOCUMENTS 8,564,181 B2  10/2013  Choi et al.
9,297,831 B2   3/2016  Ahn et al.
(Continued)

FOREIGN PATENT DOCUMENTS

FR       3023914         1/2016
KR   10-2015-0004819     1/2015
KR      10-1703281       2/2017

OTHER PUBLICATIONS

Tae Young Choi et al., "Stretchable, Transparent and Stretch-Unresponsive Capacitive Touch Sensor Array with Selectively Patterned Silver Nanowires/Reduced Graphene Oxide Electrodes", ACS Applied Materials and Interfaces, 2017, 21 pages.

*Primary Examiner* — Christopher E Leiby
(74) *Attorney, Agent, or Firm* — H.C. Park & Associates, PLC (57) ABSTRACT

A capacitor structure includes: a first substrate having a first electrode part provided on one surface thereof; a second substrate having a second electrode part provided on a surface thereof, which faces the first substrate; and a dielectric layer provided between the first substrate and the second substrate, wherein a Poisson's ratio of the first substrate or the second substrate is different from a Poisson's ratio of the dielectric layer. The capacitor structure has a substantially constant capacitance even when the capacitor structure is exposed to external strain.

16 Claims, 6 Drawing Sheets

(58) Field of Classification Search
CPC . G06F 2203/04102; G06F 2203/04103; G06F 2203/04112; G06F 2203/04809
See application file for complete search history.

(56) References Cited

U.S. PATENT DOCUMENTS

| | | | |
|---|---|---|---|
| 9,524,057 B2 | 12/2016 | Cho et al. | |
| 9,554,484 B2 | 1/2017 | Rogers et al. | |
| 2004/0017362 A1* | 1/2004 | Mulligan | G06F 3/044 345/173 |
| 2009/0273483 A1* | 11/2009 | Tompkins | G01L 1/142 340/657 |
| 2010/0207484 A1* | 8/2010 | Chang | B06B 1/0292 310/300 |
| 2011/0291976 A1* | 12/2011 | Takada | G06F 3/016 345/173 |
| 2014/0220773 A1* | 8/2014 | Tour | H01L 21/3065 438/610 |
| 2015/0082900 A1* | 3/2015 | Fuji | G01L 9/007 73/779 |
| 2015/0373831 A1* | 12/2015 | Rogers | H01L 23/18 429/121 |
| 2016/0011705 A1* | 1/2016 | Huang | G06F 3/044 345/174 |
| 2016/0048207 A1* | 2/2016 | van der Avoort | G06F 3/016 345/174 |
| 2016/0136877 A1* | 5/2016 | Rogers | B29C 61/0616 428/174 |
| 2016/0150641 A1 | 5/2016 | Yoo | |
| 2017/0176266 A1* | 6/2017 | Mathieu | A61B 5/1036 |
| 2017/0176267 A1* | 6/2017 | Keller | G01L 1/144 |
| 2017/0237037 A1* | 8/2017 | Choi | H01L 27/323 257/40 |
| 2018/0073943 A1* | 3/2018 | Zeng | G01R 27/26 |
| 2018/0105713 A1* | 4/2018 | Dietsch | H05K 3/1216 |
| 2018/0239473 A1* | 8/2018 | Wang | G06F 3/0414 |
| 2018/0267640 A1* | 9/2018 | Virgili | G06F 3/041 |
| 2019/0104979 A1* | 4/2019 | Dagdeviren | A61B 5/073 |

\* cited by examiner

FIG. 6D ated into and constitute a part of this specification,
illustrate exemplary embodiments of the inventive concepts
CAPACITOR STRUCTURE, DISPLAY DEVICE HAVING CAPACITOR STRUCTURE, AND MANUFACTURING METHOD OF CAPACITOR STRUCTURE

CROSS-REFERENCE TO RELATED APPLICATION

This application claims priority from and the benefit of Korean Patent Application No. 10-2017-0070744, filed on Jun. 7, 2017, which is hereby incorporated by reference for all purposes as if fully set forth herein.

BACKGROUND

Field

Exemplary embodiments relate to a capacitor structure, a display device having a capacitor structure, and a manufacturing method of a capacitor structure.

Discussion of the Background

Recently, flexible display devices using flat panel display devices have been developed. The flat panel display devices generally include a liquid crystal display (LCD), an organic light emitting diode (OLED), an electrophoretic display (EPD), and the like.

Since the flexible display devices have bending and folding characteristics, the flexible display devices can be folded or rolled. Accordingly, the flexible display devices can be conveniently carried while implementing large screens. The flexible display devices can be applied in various fields including not only mobile equipment such as mobile phones, portable multimedia players (PMPs), navigation devices, ultra mobile PCs (UMPCs), electronic books, and electronic newspapers, but also TVs, monitors, and the like.

In addition, the flexible display devices should maintain constant performance even when they are bent or folded.

The above information disclosed in this Background section is only for enhancement of understanding of the background of the inventive concepts, and, therefore, it may contain information that does not form the prior art that is already known in this country to a person of ordinary skill in the art.

SUMMARY

Exemplary embodiments provide a capacitor structure having a constant capacitance of a capacitor even when the capacitor structure is exposed to external strain.

Additional aspects will be set forth in the detailed description which follows, and, in part, will be apparent from the disclosure, or may be learned by practice of the inventive concepts.

According to exemplary embodiments, a capacitor structure includes: a first substrate having a first electrode part provided on one surface thereof; a second substrate having a second electrode part provided on a surface thereof, which faces the first substrate; and a dielectric layer provided between the first substrate and the second substrate, wherein a Poisson's ratio of the first substrate or the second substrate is different from that of the dielectric layer.

The first substrate, the second substrate, and the dielectric layer may be contracted or stretched in a first coordinate direction, a second coordinate direction, and a third coordinate direction.

A change of the dielectric layer in the third coordinate direction with respect to strain applied in the first coordinate direction or the second coordinate direction may be smaller than a change of the dielectric layer in the first coordinate direction or a change of the dielectric layer in the second coordinate direction.

The first coordinate direction, the second coordinate direction, and the third coordinate direction may constitute any one coordinated system selected from a Cartesian coordinate system, a cylindrical coordinate system, and a spherical coordinate system.

The Poisson's ratio of the first substrate or the second substrate may be greater than that of the dielectric layer.

The Poisson's ratio of the first substrate or the second substrate and the Poisson's ratio of the dielectric layer may have a difference of 0.2 or more.

The first electrode part and the second electrode part may be embedded in the first substrate and the second substrate, respectively.

The first electrode part and the second electrode part may include a wire-shaped conductor.

The capacitor structure may have flexibility.

Surfaces of the first substrate and the second substrate may be hydrophobic.

A thickness of the dielectric layer may be thinner than that of the first substrate or the second substrate.

According to an aspect of the present disclosure, a display device includes: the capacitor structure described above; and a display unit for displaying an image.

The capacitor structure may be included in a touch sensing unit capable of recognizing a touch of a user.

The capacitor structure may be included in a transistor for driving the display device.

According to an aspect of the present disclosure, a method of manufacturing a capacitor structure includes: preparing a first substrate; forming a mask on the first substrate; surface-treating an area of the first substrate, which is exposed without the mask; forming a first electrode part on the surface-treated area of the first substrate; forming a dielectric layer on the first substrate; and forming a second electrode part and a second substrate on the dielectric layer, wherein a Poisson's ratio of the first substrate or the second substrate is different from that of the dielectric layer.

The surface-treated area of the first substrate may be hydrophilic, and an area of the first substrate, which is not surface-treated, may be hydrophobic.

The first electrode part may be formed by coating a hydrophilic resin composition on the first substrate.

The hydrophilic resin composition may include a wire-shaped conductor.

The surface-treating may include oxygen-plasma treating the first substrate.

The forming of the second electrode part and the second substrate may include: forming a mask on the second substrate; surface-treating an area of the second substrate, which is exposed without the mask; and forming the second electrode part on the surface-treated area of the second substrate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
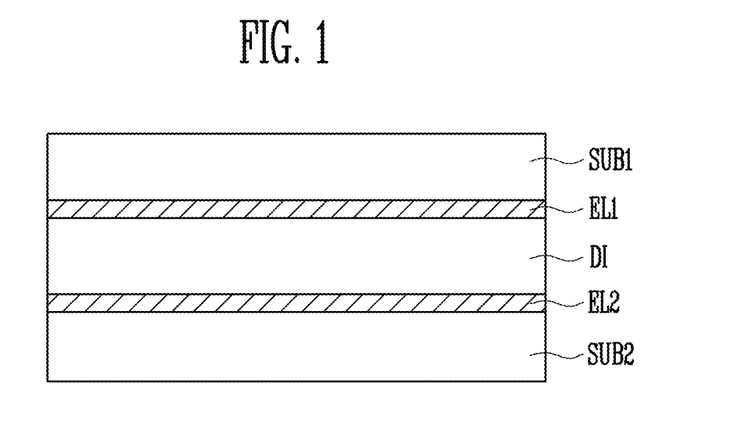
FIG. 1 is a sectional view illustrating a section of a capacitor structure according to an exemplary embodiment.

FIG. 1 is a sectional view illustrating a section of a capacitor structure according to an exemplary embodiment.

The capacitor structure includes a first substrate SUB1 having a first electrode part EL1 provided on one surface thereof, a second substrate SUB2 having a second electrode part EL2 provided on a surface thereof, which faces the first substrate SUB1, and a dielectric layer DI provided between the first substrate SUB1 and the second substrate SUB2. The first substrate SUB1, the second substrate SUB2, and the dielectric layer DI have Poisson's ratios determined by the following Equation 1, and a Poisson's ratio of the first substrate SUB1 or the second substrate SUB2 is different from that of the dielectric layer DI.

$$v = -\varepsilon_a/\varepsilon_b \quad \text{Equation 1}$$

At this time, v is a Poisson's ratio, $\varepsilon_a$ and $\varepsilon_b$ are length variations in directions a and b, respectively, and each of a and b is any one selected from a first coordinate direction, a second coordinate direction, and a third coordinate direction. Here, a and b are different from each other.

As the exemplary capacitor structure has the above-described features, the capacitance of a capacitor can be constantly maintained even when the shape of the capacitor structure is changed by strain.

In general, the capacitance of a capacitor in a capacitor structure is determined by the following Equation 2.

$$C = \frac{\varepsilon A}{d} \quad \text{Equation 2}$$

Here, C is a capacitance of the capacitor, is a dielectric constant, A is an overlapping area of capacitor electrodes, and d is a distance between the capacitor electrodes.

As can be seen in Equation 2, the capacitance of the capacitor is influenced by the overlapping area of the capacitor electrodes, the distance between the capacitor electrodes, and the dielectric constant. In general, the dielectric constant is constantly maintained as long as there is no particular problem after the capacitor structure is manufactured. Therefore, major factors that have influence on the capacitance of the capacitor are the overlapping area of the capacitor electrodes and the distance between the capacitor electrodes.

The overlapping area of the capacitor electrodes and the distance between the capacitor electrodes may be changed depending on a change in shape of the capacitor structure. Such a phenomenon may frequently occur when the capacitor structure is included in a flexible device. As the shape of the flexible device is changed, the shape of the capacitor structure is changed, and accordingly, the overlapping area of the capacitor electrodes and the distance between the capacitor electrodes are changed, thereby changing the capacitance of the capacitor.

When the capacitance of the capacitor is changed as the shape of the flexible device is changed, a constant operation of the flexible device cannot be guaranteed. For example, when the flexible device is a display device including a capacitive touch panel, the capacitance of the capacitor may be changed depending on the shape of the flexible device even when there is no touch. This may cause that the lowering of sensitivity of the touch panel, which results in malfunction of the touch panel. Therefore, it is necessary to provide a capacitor structure capable of providing a constant capacitance of a capacitor even when the shape of the flexible device is changed.

According to the exemplary embodiment, the first substrate SUB1, the second substrate SUB2, and the dielectric layer DI have Poisson's ratios determined by the following Equation 1, and the Poisson's ratio of the first substrate SUB1 or the second substrate SUB2 is different from that of the dielectric layer DI.

As can be seen in Equation 1, the Poisson's ratio represents a ratio of length variations in two directions different from each other. As an example, when the coordinate system defined by the first, second, and third coordinate directions is a Cartesian coordinate system, $\varepsilon_a$ represents a length variation in an x-axis direction, and $\varepsilon_b$ represents a length variation in a y-axis direction, the Poisson's ratio becomes a ratio of the length variation in the x-axis direction to the length variation in the y-axis direction. As another example, when $\varepsilon_a$ represents a length variation in the x-axis direction and $\varepsilon_b$ represents a length variation in a z-axis direction, the Poisson's ratio becomes a ratio of the length variation in the x-axis direction to the length variation in the z-axis direction. The Poisson's ratio may be changed depending on the kind of a capacitor structure and the shape of a coordinate system applied to the capacitor structure. At this time, the length variation refers to a ratio obtained by dividing a variation in length into the original length.

When $\varepsilon_a$ represents a length variation in the x-axis direction, and $\varepsilon_b$ represents a length variation in the y-axis direction, Equation 1 may be expressed by Equation 3.

$$-v\varepsilon_{xx} = \varepsilon_{yy} \quad \text{Equation 3}$$

In addition, when $\varepsilon_a$ represents a length variation in the z-axis direction, and $\varepsilon_b$ represents a length variation in the x-axis direction, Equation 1 may be expressed by Equation 4.

$$-v\varepsilon_{xx} = \varepsilon_{zz} \quad \text{Equation 4}$$

Equations 3 and 4 mean that, when the capacitor structure is pulled in the x-axis direction, a length of the capacitor structure in the x-axis direction increases, and simultaneously, lengths of the capacitor structure in the y-axis direction and the z-axis direction decrease. When the capacitor structure is an anisotropic structure, the Poisson's ratio v may be changed in Equations 3 and 4. However, for convenience of description, it is assumed that the Poisson's ratio is constant regardless of direction.

According to the relationship between the Poisson's ratio defined in Equations 3 and 4 and the length variation based on direction, when the length of the capacitor structure in the x-axis direction increases, and simultaneously, the lengths of the capacitor structure in the y-axis direction and the z-axis direction decrease, the capacitance of the capacitor may be defined by Equation 5.

$$C = \epsilon \frac{\{(1+\varepsilon_{xx})L_0\}\{(1-v\,\varepsilon_{xx})W_0\}}{\{(1-v\,\varepsilon_{xx})D_0\}} = C_0(1+\varepsilon_{xx}) \quad \text{Equation 5}$$

At this time, C is a changed capacitance of the capacitor, $C_0$ is a capacitance before the capacitance of the capacitor is changed, $\varepsilon_{xx}$ is a length variation of the capacitor structure in the x-axis direction, v is a Poisson's ratio of the capacitor structure, $L_0$ is a length of the capacitor structure in the x-axis direction, $W_0$ is a length of the capacitor structure in the y-axis direction, and $D_0$ is a length of the capacitor structure in the z-axis direction.

Here, for convenience of description, it is assumed that the Poisson's ratios of the two substrates and the dielectric layer in the capacitor structure are equal to one another. As can be seen in Equation 5, when the Poisson's ratios of the two substrates and the dielectric layer in the capacitor structure are equal to one another, the capacitance of the capacitor after lengths increases by a value obtained by multiplying a capacitance of the capacitor before the capacitance of the capacitor is changed and a length variation in the x-axis direction.

A change in shape of the capacitor structure may be caused by strain applied to the capacitor structure. Therefore, the strain applied to the capacitor structure may become a factor that causes a change in capacitance of the capacitor. The relationship between strain applied to the capacitor structure and a change in capacitance of the capacitor can be seen through a gauge factor G defined by the following Equation 6.

$$G = \frac{C - C_0}{C_0 \varepsilon_{xx}} \quad \text{Equation 6}$$

At this time, G is a gauge factor, C is a changed capacitance of the capacitor, $C_0$ is a capacitance before the capacitance of the capacitor is changed, and $\varepsilon_{xx}$ is a length variation of the capacitor structure in the x-axis direction.

Like Equation 5, Equation 6-1 represents a gauge factor when Poisson's ratios of two substrates and a Poisson's ratio of a dielectric layer provided between the two substrates are equal to one another.

$$G = \frac{C - C_0}{C_0 \varepsilon_{xx}} = \frac{C_0(1 + \varepsilon_{xx}) - C_0}{C_0 \varepsilon_{xx}} = 1 \quad \text{Equation 6-1}$$

At this time, G is a gauge factor, C is a changed capacitance of the capacitor, $C_0$ is a capacitance before the capacitance of the capacitor is changed, and $\varepsilon_{xx}$ is a length variation of the capacitor structure in the x-axis direction.

In Equation 6-1, that the gauge factor is 1 means that an increment of the strain applied to the capacitor structure is theoretically equal to that of the capacitance of the capacitor. For example, when the gauge factor is 1, the capacitance of the capacitor increases by 10% when the strain applied to the capacitor structure increases by 10%.

Thus, when the capacitor structure is stretched in the x-axis direction, it can be seen from Equation 5 and the gauge factor of Equations 6-1 that the capacitance of the capacitor is changed. When the capacitance of the capacitor is changed as the shape of the capacitor structure is changed, malfunction may be caused as described above. In order to prevent such a problem, the first substrate SUB1, the second substrate SUB2, and the dielectric layer DI, which are included in the capacitor structure according to the present disclosure, have different Poisson's ratios.

The first substrate SUB1 and the second substrate SUB2, which are included in the capacitor structure according to the present disclosure, may have a Poisson's ratio of $v_s$, and the dielectric layer DI included in the capacitor structure may have Poisson's ratio of $v_d$. According to the embodiment of the present disclosure, the Poisson's ratios of the first substrate SUB1 and the second substrate SUB2 are the same as $v_s$. However, the Poisson's ratios of the first substrate SUB1 and the second substrate SUB2 may be configured different from each other, if necessary. However, in this case, the Poisson's ratio of the first substrate SUB1 is different from that of the dielectric layer DI, and the Poisson's ratio of the second substrate SUB1 is different from that of the dielectric layer DI.

The above-described capacitor structure according to the present disclosure has a gauge factor defined by Equation 6. In the above-described capacitor structure according to the present disclosure, the gauge factor may be represented by the following Equation 6-2.

$$G = \frac{C - C_0}{C_0 \varepsilon_{xx}} = \left[ \frac{\{(1 + \varepsilon_{xx})\}\{(1 - v_s \varepsilon_{xx})\}}{\left\{1 - \frac{v_d}{1 - v_d}(1 - v_s)\varepsilon_{xx}\right\}} - 1 \right] \frac{1}{\varepsilon_{xx}} \quad \text{Equation 6-2}$$

At this time, G is a gauge factor, C is a changed capacitance of the capacitor, $C_0$ is a capacitance before the capacitance of the capacitor is changed, $\varepsilon_{xx}$ is a length variation of the capacitor structure in the x-axis direction, $v_s$ is a Poisson's ratio of the first substrate SUB1 or the second substrate SUB2, and $v_d$ is a Poisson's ratio of the dielectric layer DI.

According to Equation 6-2, the gauge factor of the capacitor structure may be changed depending on the Poisson's ratio $v_s$ of the first substrate SUB1 or the second substrate SUB2, the Poisson's ratio $v_d$ of the dielectric layer DI, and the length variation in the x-axis direction.

A theoretical value of the gauge factor of the capacitor structure may be calculated using Equation 6-2. For example, the gauge factor of the capacitor structure is about 0.556, in which the length variation in the x-axis direction is 60%, the Poisson's ratio $v_s$ of the first substrate SUB1 or the second substrate SUB2 is about 0.5, and the Poisson's ratio $v_d$ of the dielectric layer DI is about 0.35. However, the gauge factor is a theoretical value, and a gauge factor of an actual capacitor structure may be different from the theoretical value.

Specifically, the magnitude of a gauge factor of an actual capacitor structure may be different from the theoretical value calculated by Equation 6-1 or Equation 6-2. This may be influenced by a fringing field generated from the capacitor structure. The fringing field refers to an electric field formed toward an end of the other electrode from an end of one electrode. The fringing field may become a factor that allows the actual value of the gauge factor to be smaller than the theoretic value. This is because the fringing field is hardly influenced by a change in shape of the capacitor structure. Therefore, although the capacitor structure is deformed by strain, the magnitude of the fringing field or the magnitude of a capacitance of the capacitor, caused by the fringing field, is hardly changed. Accordingly, a change in capacitance $C - C_0$ of the capacitor in Equation 6-1 or Equation 6-2 may be smaller than the theoretical value. According to the theoretical calculation, this is because the capacitance of the capacitor, caused by the fringing field, is also changed by strain as the capacitor structure is deformed. Therefore, for example, an actual gauge factor may be about 0.556 in the capacitor structure of which gauge factor is calculated as 1 by Equation 6-1.

As described above, the gauge factor of the capacitor structure may be changed depending on the Poisson's ratio $v_s$ of the first substrate SUB1 or the second substrate SUB2 and the Poisson's ratio $v_d$ of the dielectric layer DI. The following Table 1 shows gauge factors according to materials of the first substrate SUB1, the second substrate SUB2, the first and second electrode parts EL1 and EL2, and the dielectric layer DI.

TABLE 1

| First and second substrates | First and second electrode parts | Dielectric layer | Gauge factor |
|---|---|---|---|
| PDMS | CNTs | Ecoflex ® | 0.4 |
| PU | AgNWs | 3M Scotch 924 ATG tape | 0.5 |
| PDMS | AgNWs | Ecoflex ® | 0.7 |
| PDMS | Au | PDMS | 0.75 |
| PDMS | CNTs | Dragon skin ® elastomer | 0.97 |
| Silicone | CNTs | Silicone | 0.99 |
| PDMS | AgNWs | PDMS | 1 |
| PDMS | AgNWs-rGO | PU | 0.1 |

In Table 1, PDMS denotes polydimethylsiloxane, PU denotes polyurethane, CNT denotes carbon nano tube, AgNW denotes silver nano wire, AgNWs-rGO denotes silver nano wire/reduced graphene oxide, and Ecoflex® denotes platinum-catalyzed silicone rubber of Smooth-on, INC. Dragon Skin® elastomer also denotes silicone rubber of Smooth-on, INC.

As can be seen in Table 1, the substrates SUB1 and SUB2, the electrode parts EL1 and EL2, and the dielectric layer DI may be formed using various kinds of materials. Since the gauge factor of the capacitor structure is changed depending on kinds of materials constituting the substrates SUB1 and SUB2, the electrode parts EL1 and EL2, and the dielectric layer DI, the substrates SUB1 and SUB2, the electrode parts EL1 and EL2, and the dielectric layer DI can be manufactured by selecting a combination of materials, which minimizes the gauge factor.

In Equations 6 to 6-2, the gauge factor is defined using the length variation $\varepsilon_{xx}$ in the x-axis direction, but a length variation in another direction may be used rather than the length variation in the x-axis direction.

The length variation may reflect strain applied to the capacitor structure. In general, as the magnitude of strain applied to the capacitor structure becomes larger, the degree of deformation of the capacitor structure becomes larger. Hence, a length variation in a specific direction is in proportion to the magnitude of strain applied in the specific direction. Thus, a magnitude of strain applied to the capacitor structure and a change in capacitance of the capacitor according to the magnitude of the strain can be identified by comparing the length variation with the gauge factor.

In the case of a capacitor structure in which the Poisson's ratio $v_s$ of the first substrate SUB1 or the second substrate SUB2 is about 0.5 and the Poisson's ratio $v_d$ of the dielectric layer DI is about 0.3, the gauge factor and the capacitance of the capacitor may be changed as follows, according to a length variation in the y-axis direction or a change in strain. In the following Table 2, C denotes a capacitance of the capacitor when strain is applied, and $C_0$ denotes a capacitance of the capacitor before the strain is applied.

TABLE 2

| Strain ($\varepsilon_{yy}$) | Gauge factor (G) | C/C$_0$ |
|---|---|---|
| 10% | 0.65 | 1.07 |
| 20% | 0.64 | 1.12 |
| 30% | 0.60 | 1.18 |
| 40% | 0.56 | 1.23 |
| 50% | 0.52 | 1.26 |
| 60% | 0.48 | 1.29 |

As described above, Table 2 shows a case where the difference between the Poisson's ratio $v_s$ of the first substrate SUB1 or the second substrate SUB2 and the Poisson's ratio $v_d$ of the dielectric layer DI is about 0.2. It can be seen that, although the difference between the two Poisson's ratios is not relatively large, a change in gauge factor or capacitance of the capacitor, caused by the strain, is considerably reduced. When the Poisson's ratio $v_s$ of the first substrate SUB1 or the second substrate SUB2 and the Poisson's ratio $v_d$ of the dielectric layer DI are equal to each other in the conventional art, the gauge factor may become 1, and the capacitance of the capacitor may be changed by a change in strain. For example, a case where the strain is 60% will be described. In the capacitor structure according to Table 2, it can be seen that the capacitance of the capacitor is changed by 29% when the strain is changed by 60%. However, when the gauge factor is 1 in the conventional art, the capacitance of the capacitor is changed by 60% when the strain is changed by 60%. Such a change in capacitance of the capacitor may result in malfunction of a device including the capacitor as described above.

Referring to Table 2, it can be seen that the gauge factor is changed as the strain increases. This may be influenced by the above-described fringing field. Specifically, because of the influence of the fringing field, the capacitance of the capacitor is not changed by a change in strain, and accordingly, the gauge factor is not maintained as a constant value.

In the above, a case where the first, second, and third coordinate directions constitute the Cartesian coordinate system is illustrated as an example so as to explain the relationship between a change in strain and a capacitance of the capacitor. However, the first, second, and third coordinate directions may not necessarily constitute the Cartesian coordinate system in the above-described example. For example, the first, second, and third coordinate directions may constitute a cylindrical coordinate system or a spherical coordinate system. Therefore, in some cases, the first, second, and third coordinate directions may be a radial direction (r), an angular direction (θ), and a height direction (z), respectively. In this case, the Poisson's ratios and the gauge factor may also be evaluated by calculating length variations in the respective directions as described above.

FIGS. 2A to 2E are sectional, perspective, and plan views illustrating a shape of a capacitor structure when the capacitor structure is exposed to external strain. For convenience, the shape of the capacitor is described using the Cartesian coordinate system in FIGS. 2A to 2E. However, the exemplary embodiments are not limited thereto, and other coordinate systems except the Cartesian coordinate system may be applied using the same principle.

Figure 2A:
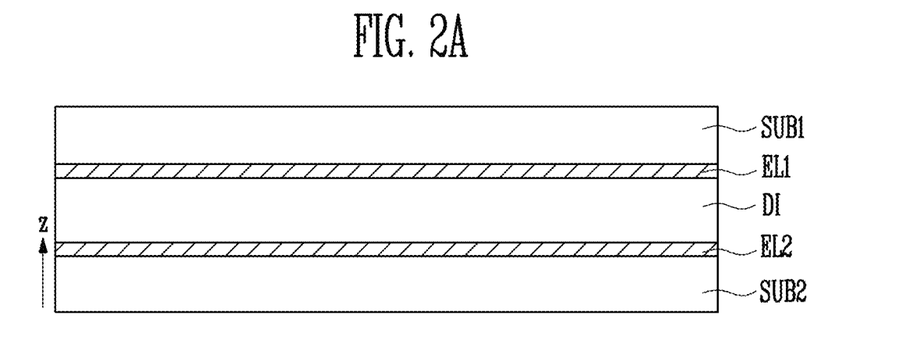
FIGS. 2A, 2B, 2C, 2D, and 2E are sectional, perspective, and plan views illustrating a shape of a capacitor structure when the capacitor structure is exposed to external strain.

When comparing FIG. 2A with FIG. 1, the capacitor structure of FIG. 2A has a shape that is stretched in the horizontal direction and is contracted in the vertical direction. As can be seen in FIG. 2A, the distance between the first electrode part EL1 and the second electrode part EL2 in the capacitor structure is changed as strain is applied. When comparing FIG. 2A with FIG. 1, it can be seen that the distance between the first electrode part EL1 and the second electrode part EL2 is changed. Such a change in distance has influence on the capacitance of a capacitor.

The distance between the first electrode part EL1 and the second electrode part EL2, which has influence on the capacitance of the capacitor, is influenced by a change in shape of the dielectric layer DI provided between the first electrode part EL1 and the second electrode part EL2. The dielectric layer DI has a hardness relatively lower than that of the first substrate SUB1 or the second substrate SUB2. Therefore, the shape of the dielectric layer DI may be changed relatively more as strain is applied. Referring to FIGS. 2B to 2E, it can be seen that the shape of the dielectric layer DI when a substrate is provided is different from that of the dielectric layer DI when the substrate is not provided.

First, in FIGS. 2B to 2E, the shape of the dielectric layer DI before the strain is applied is indicated by one-dotted chain line. In addition, when the substrate is not provided, the shape of the dielectric layer DI after the strain is applied is indicated by a dotted line. Finally, when the substrate is provided, the shape of the dielectric layer DI after the strain is applied is indicated by a solid line.

Figure 2B:
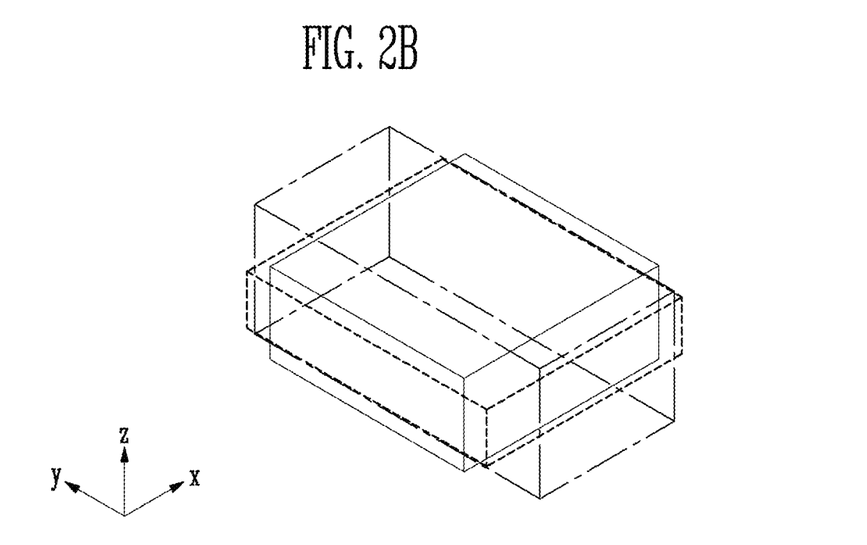

Referring to FIG. 2B, it can be seen that, as the strain is applied, the dielectric layer DI is stretched in the x-axis direction and is contracted in the y-axis direction and the z-axis direction. The change can be identified by comparing the dielectric layer DI indicated by the one-dotted chain line (before the strain is applied) with the dielectric layer DI indicated by the solid line (after the strain is applied). In addition, the shape of the dielectric layer DI changed more when the substrate is not provided. This can be identified by comparing the dielectric layer DI indicated by the dotted line (when the substrate is provided) with the dielectric layer DI indicated by the solid line (when the substrate is not provided).

Figure 2C:
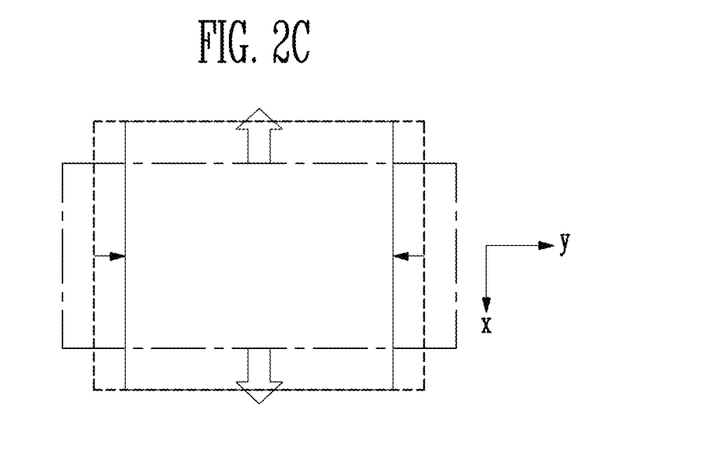

FIG. 2C shows a state in which the dielectric layer DI of FIG. 2B is viewed in the z-axis direction. Referring to FIG. 2C, when the strain is applied, changes in shape of the dielectric layer DI in the x-axis direction and the y-axis direction can be more easily identified. The dielectric layer DI is stretched in the x-axis direction and is contracted in the y-axis direction. At this time, a variation in the x-axis direction when the substrate is provided (the solid line) is equal to that in the x-axis direction when the substrate is not provided (the dotted line). However, a variation in the y-axis direction when the substrate is provided (the solid line) is different from that in the y-axis direction when the substrate is not provided (the dotted line). The difference between change aspects of the dielectric layer DI according to whether the substrate is provided will be described later after FIGS. 2D and 2E are described.

Figure 2D:
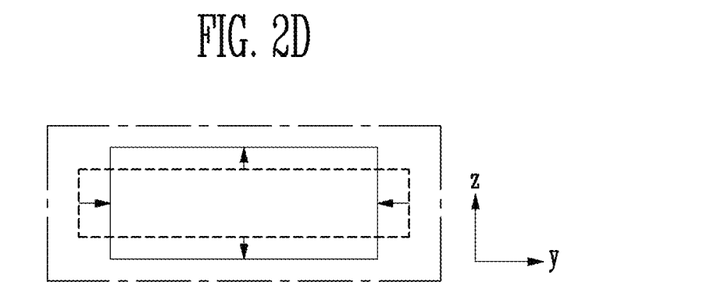

FIG. 2D shows a state in which the dielectric layer DI of FIG. 2B is viewed in the x-axis direction. Referring to FIG. 2D, when the strain is applied, the dielectric layer DI is contracted in both of the y-axis direction and the z-axis direction. However, a change aspect of the dielectric layer DI when the substrate is provided (the solid line) is different from that of the dielectric layer DI when the substrate is not provided (the dotted line). When the substrate is provided (the solid line), the dielectric layer DI is changed less in the z-axis direction and is changed more in the y-axis direction as the strain is applied. On the other hand, when the substrate is not provided (the dotted line), the dielectric layer DI is changed relatively more, and when the strain is applied, the dielectric layer DI is changed relatively less.

Figure 2E:
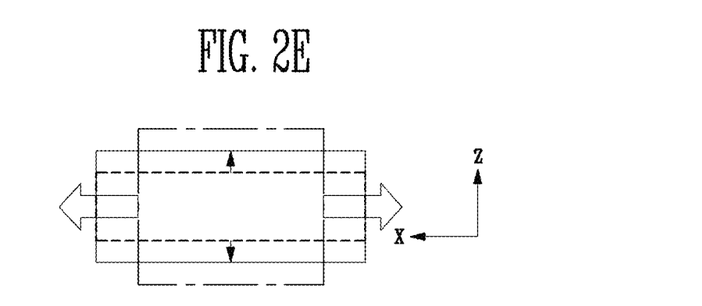

Such a phenomenon can also be identified in FIG. 2E. FIG. 2E shows a state in which the dielectric layer DI of FIG. 2B is viewed in the y-axis direction. Referring to FIG. 2E, when the strain is applied, the dielectric layer DI is stretched in the x-axis direction and is contracted in the z-axis direction. A variation in the x-axis direction when the substrate is provided (the solid line) is equal to that in the x-axis direction when the substrate is not provided (the dotted line). However, a variation in the z-axis direction when the substrate is provided (the solid line) is different from that in the z-axis direction when the substrate is not provided (the dotted line). The variation in the z-axis direction when the substrate is not provided (the dotted line) is larger than that in the z-axis direction when the substrate is provided (the solid line).

By synthesizing FIGS. 2B to 2E, it can be seen that the change aspect of the dielectric layer DI, caused by the application of strain, may be changed depending on whether the substrate is provided. Specifically, it can be seen that, when strain is applied in the x-axis direction, a variation of the dielectric layer DI in the x-axis direction when the substrate is provided is equal to that of the dielectric layer DI in the x-axis direction when the substrate is not provided, but variations of the dielectric layer DI in the y-axis and z-axis directions when the substrate is provided are different from those of the dielectric layer DI in the y-axis and z-axis directions when the substrate is not provided. When the substrate is not provided and the strain is applied in the x-axis direction, the dielectric layer DI is changed relatively more in the z-axis direction. This means that a change in capacitance of a capacitor may become larger when the substrate is not provided. As described above, the capacitance of the capacitor may be influenced by the distance between the two electrode parts EL1 and EL2, and the distance between the two electrode parts EL1 and EL2 may be influenced by the shape of the dielectric layer DI. Therefore, as the dielectric layer DI is changing more in the z-axis direction when the strain is applied, the distance between the two electrode parts EL1 and EL2 may be changed a lot, and the capacitance of the capacitor may also be changed a lot.

According to the exemplary embodiments, the substrates SUB1 and SUB2 having a Poisson's ratio greater than that of the dielectric layer DI are provided together with the dielectric layer DI, so that it is possible to suppress a change of the dielectric layer DI in the z-axis direction. Specifically, when strain is applied in the x-axis direction or the y-axis direction, a change of the dielectric layer DI in the z-axis direction may be smaller than that of the dielectric layer DI in the x-axis direction or the z-axis direction. At this time, the z-axis direction refers to a direction vertical to a surface on which the dielectric layer DI and the two electrode parts EL1 and EL2 are in contact with each other, or a thickness direction of the dielectric layer DI.

In addition, according to an exemplary embodiment, the dielectric layer DI having a thickness thinner than that of each of the substrates SUB1 and SUB2 may be used to suppress the change of the dielectric layer DI in the z-axis direction. The thin dielectric layer DI coated on the relatively thick substrates SUB1 and SUB2 may be changed largely in the y-axis direction along the substrates SUB1 and SUB2 when strain is applied in the x-axis direction. In this case, as the dielectric layer DI is contracted largely in the y-axis direction, the change of the dielectric layer DI in the z-axis direction may become relatively small.

As described above, in the capacitor structure according to the exemplary embodiment, the substrates SUB1 and SUB2 having a Poisson's ratio greater than that of the dielectric layer DI are provided together with the dielectric layer DI, and the dielectric layer DI having a thickness thinner than that of each of the substrates SUB1 and SUB2 is used, so that it is possible to suppress the change of the dielectric layer DI in the z-axis direction, caused by the application of strain. In addition, as the change of the dielectric layer DI in the z-axis direction, caused by the application of strain, is suppressed, the capacitance of the capacitor is not changed much even when the strain is applied.

In the capacitor structure according to the exemplary embodiment, the change of the dielectric layer DI in the z-axis direction can be suppressed even when strain is applied in the y-axis direction. Similarly, in the capacitor structure, the substrates SUB1 and SUB2 having a Poisson's ratio greater than that of the dielectric layer DI may be provided together with the dielectric layer DI, and the dielectric layer DI having a thickness thinner than that of each of the substrates SUB1 and SUB2 may be used. Accordingly, the dielectric layer DI may be contracted relatively more in the x-axis direction and be contracted relatively less in the z-axis direction. At this time, the z-axis direction refers to a direction vertical to a surface on which the dielectric layer DI and the two electrode parts EL1 and EL2 are in contact with each other, or a thickness direction of the dielectric layer DI.

For example, in the case of a capacitor structure in which the Poisson's ratio $v_s$ of the first substrate SUB1 or the second substrate SUB2 is about 0.5 and the Poisson's ratio $v_d$ of the dielectric layer DI is about 0.3, when the length variation in the y-axis direction is 0.3, the substrates SUB1 and SUB2 having the Poisson's ratio $v_s$ are provided, so that the length variation in the z-axis direction can be changed by only 6.4%. This is a relatively small numerical value when compared with a change of 9% when the substrates SUB1 and SUB2 are not provided.

According to an exemplary embodiment, the Poisson's ratio $v_s$ of the first substrate SUB1 or the second substrate SUB2 is greater than the Poisson's ratio $v_d$ of the dielectric layer DI. As the Poisson's ratio $v_s$ of the first substrate SUB1 or the second substrate SUB2 is greater than the Poisson's ratio $v_d$ of the dielectric layer DI, it is possible to suppress the change of the dielectric layer DI in the z-axis direction as described above. Accordingly, even when strain is applied to the capacitor structure, the capacitance of the capacitor is relatively constantly maintained, and malfunction of the capacitor and a device including the same is prevented.

According to an exemplary embodiment, the Poisson's ratio $v_s$ of the first substrate SUB1 or the second substrate SUB2 and the Poisson's ratio $v_d$ of the dielectric layer DI may have a difference of about 0.2 or more. When the Poisson's ratio $v_s$ of the first substrate SUB1 or the second substrate SUB2 and the Poisson's ratio $v_d$ of the dielectric layer DI have a difference of less than about 0.2, the change of the dielectric layer DI in the z-axis direction may not be sufficiently suppressed.

According to an exemplary embodiment, the dielectric layer DI may have a Poisson's ratio $v_d$ of about 0.5 to about −1. The Poisson's ratio $v_d$ of the dielectric layer DI may be determined by considering the Poisson's ratio $v_s$ of the first substrate SUB1 or the second substrate SUB2. As the Poisson's ratio $v_s$ of the first substrate SUB1 or the second substrate SUB2 becomes larger, the range of selecting the Poisson's ratio $v_d$ of the dielectric layer DI becomes relatively wider. The range of the Poisson's ratio $v_d$ of the dielectric layer DI is determined by considering the efficiency and easiness of a stacking process of the dielectric layer DI while suppressing the change of the dielectric layer DI in the z-axis direction. When the Poisson's ratio $v_d$ of the dielectric layer DI exceeds 0.5, it is difficult to suppress the change of the dielectric layer DI in the z-axis direction. In addition, when the Poisson's ratio $v_d$ of the dielectric layer DI is less than about −1, it is difficult to perform the stacking process of the dielectric layer DI, and the efficiency of the stacking process may be deteriorated.

Figure 3A:
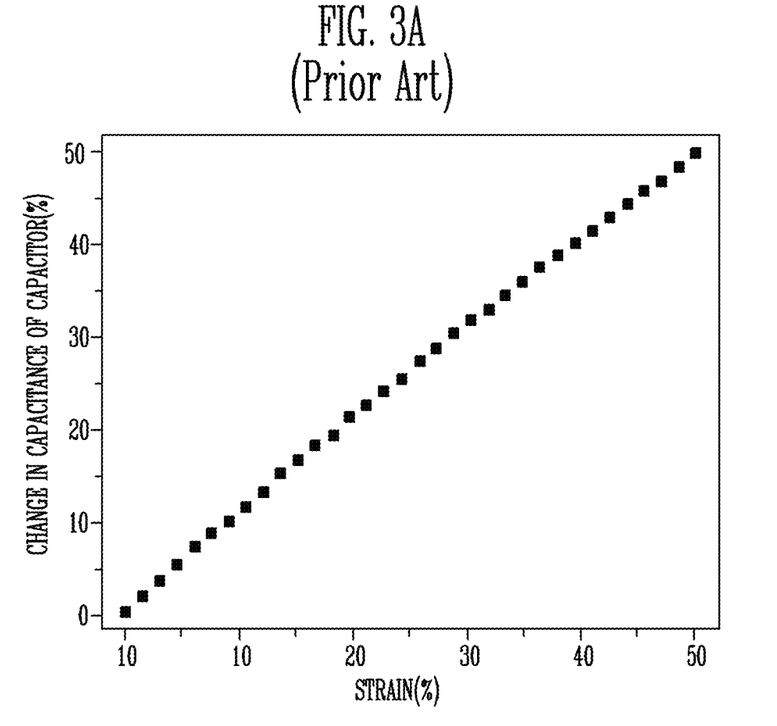
FIG. 3A is a graph illustrating a relationship between capacitance of a capacitor and strain with respect to a capacitor structure according to conventional art.
Figure 3B:
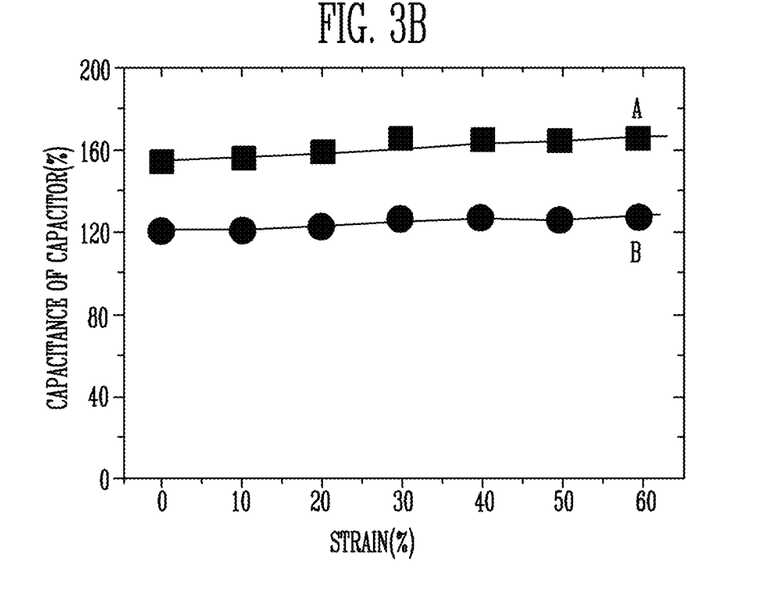
FIG. 3B is a graph illustrating a relationship between capacitance of a capacitor and strain with respect to a capacitor structure according to an exemplary embodiment.

FIG. 3A is a graph illustrating a relationship between capacitance of a capacitor and strain with respect to a capacitor structure according to a conventional art. FIG. 3B is a graph illustrating a relationship between capacitance of a capacitor and strain with respect to a capacitor structure according to an exemplary embodiment.

Referring to FIG. 3A, strain is in proportion to a change in capacitance of the capacitor. Therefore, the capacitance of the capacitor is changed as much as the strain applied to the capacitor structure is changed. In this case, it is difficult to apply the capacitor structure to a flexible device. In the case of a flexible device, as the flexible device is bent, folded, and stretched, strain may be applied to the capacitor structure in various directions. If the capacitance of the capacitor is changed as the strain is applied to the capacitor structure, the capacitance of the capacitor may be continuously changed as the shape of the flexible device is changed. If the capacitance of the capacitor is not constantly maintained, a problem may occur in performing capacitive touch sensing using the capacitor structure, performing the function of a thin film transistor, or the like. Therefore, the capacitor structure applied to the flexible device preferably has a relatively constant capacitance of the capacitor even when the shape of the flexible device or the capacitor structure is changed.

FIG. 3B illustrates a capacitor structure according to an exemplary embodiment. Specifically, the capacitor structure of FIG. 3B is a capacitor structure applied to a capacitive touch panel. In FIG. 3B, A represents a case where there is no touch applied by a user. In FIG. 3B, B represents a case where there is a touch applied by the user. Referring to FIG. 3B, in both cases where there is no touch applied by the user and where there is a touch applied by the user, the capacitance of the capacitor is not substantially changed resulting from a change in strain. In FIG. 3B, the gauge factor of the capacitor structure is about 0.1. When comparing a case where strain of 60% is applied with a case where any strain is not applied, the change in capacitance of the capacitor in the capacitor structure according to the exemplary embodiment is merely about 6%. This is a level at which there is substantially no problem in performing the function of the capacitor structure, e.g., sensing a touch applied by the user.

Figure 4A:
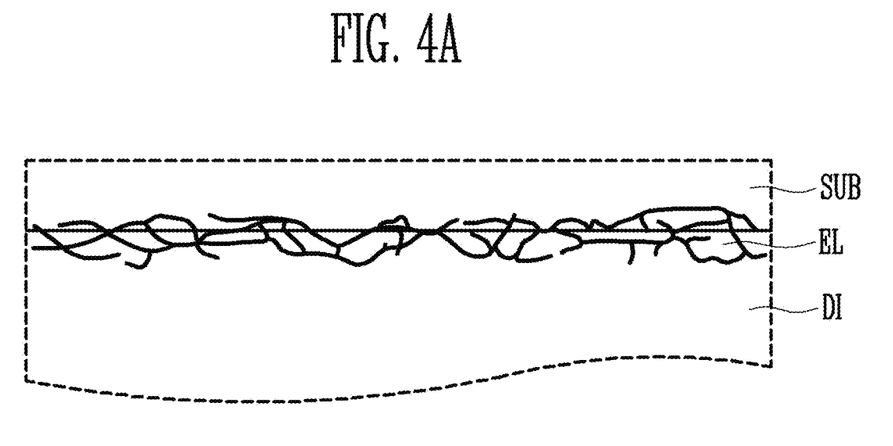
FIG. 4A is an enlarged sectional view illustrating an electrode part according to an exemplary embodiment.

FIG. 4A is an enlarged sectional view illustrating an electrode part according to an exemplary embodiment.

In FIG. 4A, a substrate SUB and an electrode part EL are illustrated for convenience of description. However, the substrate SUB of FIG. 4A may mean the first substrate SUB1 and/or the second substrate SUB2 of FIG. 1, and the electrode part EL of FIG. 4A means the first electrode part EL1 and/or the second electrode part EL2 of FIG. 1.

Referring to FIG. 4A, the electrode part EL is embedded in the substrate SUB, which means that a portion of the electrode part EL is inserted into the substrate SUB. Therefore, the gap between the electrode part EL and the substrate SUB does not have a flat interface shape but has a tangled shape as can be seen in FIG. 4A. However, the shape of the electrode part EL shown in FIG. 4A is merely illustrative, and the embedded electrode part EL may have various shapes as well as the above-described shape.

As the electrode part EL is embedded in the substrate SUB, the shape of the electrode part EL can be easily restored, and it is possible to prevent the electrode part EL from being broken. The capacitor structure according to the exemplary embodiment can be used in a flexible device, and the flexible device can be bent or stretched in the use thereof. Since the electrode part EL is less flexible as compared with other components in the capacitor structure, the electrode part EL may be distorted or broken as the electrode part EL does not follow a change in shape of the flexible device. In particular, such a phenomenon may easily occur when the electrode part EL has a planar shape. Since the electrode part EL is embedded in the substrate SUB, the shape of the electrode part EL may be easily changed as the substrate SUB is moved. For example, the electrode part EL may be easily stretched or contracted as the capacitor structure is stretched or contracted. Thus, the electrode part EL embedded in the substrate SUB is not easily broken even when the capacitor structure is stretched or contracted, and the shape of electrode part EL can be easily restored.

The electrode part EL according to the exemplary embodiment may include a wire-shaped conductor. The wire shape may include a shape such as a cylinder, a quadrangular pillar, or a triangular pillar, which is long in the length direction and has a narrow width. The width of the wire shape may be a few nanometers. The wire-shaped conductor is suitable to be embedded in the substrate SUB. A method of embedding the wire-shaped conductor in the substrate SUB will be described in detail later. The kind of the conductor is not particularly limited. However, as can be seen in Table 2, the kind of the conductor may have influence on the gauge factor of the capacitor structure, and hence a material capable of minimizing the gauge factor may be used as the conductor for forming the electrode part EL.

Figure 4B:
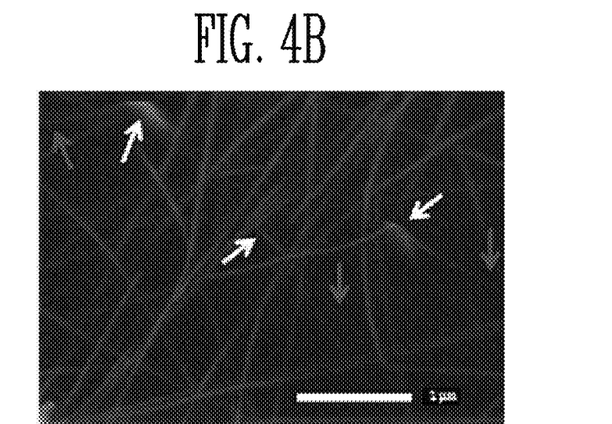
FIG. 4B is an enlarged plan view illustrating the electrode part.

FIG. 4B is an enlarged plan view illustrating the electrode part. According to FIG. 4B, the electrode part includes a plurality of wire-shaped conductors, and the conductors are embedded in the substrate. In FIG. 4B, the electrode part is photographed using FE-SEM. Referring to FIG. 4B, the wire-shaped conductor can be seen in an area indicated by a white arrow. However, the wire-shaped conductor cannot be seen in an area indicated by a grey arrow. This is because, as the wire-shaped conductor is embedded in the substrate, some of the conductors protrude from a surface of the substrate and the other conductors exist in the substrate. The conductors that can be seen in FIG. 4B are the ones protruding from the surface of the substrate. It can be seen that, when the top surface of the electrode part has a state shown in FIG. 4B, the wire-shaped conductors are stably embedded in the substrate.

The capacitor structure according to the exemplary embodiment may have flexibility. As described above, in the capacitor structure, the change of the dielectric layer in the z-axis direction is suppressed, and hence the capacitance of the capacitor can be relatively constantly maintained even when strain is applied to the capacitor structure.

Figure 5:
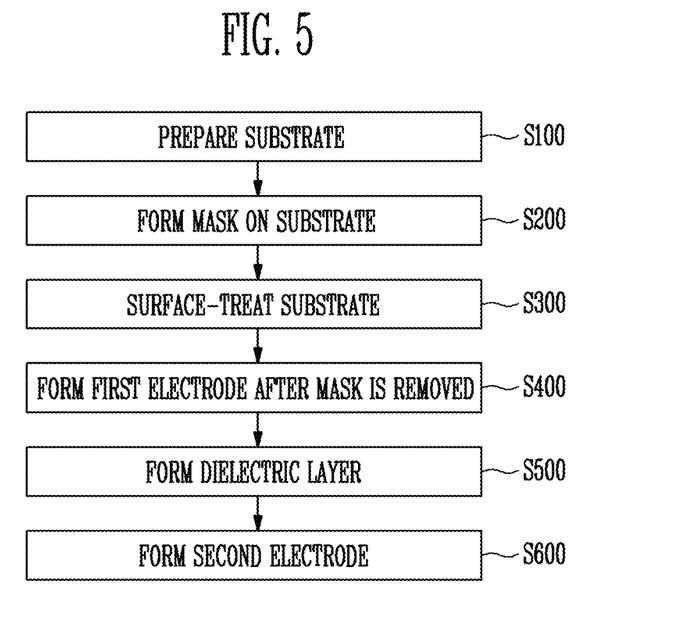
FIG. 5 is a flowchart illustrating a manufacturing method of a capacitor structure according to an exemplary embodiment.

FIG. 5 is a flowchart illustrating a manufacturing method of a capacitor structure according to an exemplary embodiment. FIGS. 6A to 6D are sectional views sequentially illustrating the manufacturing method of the capacitor structure according to the exemplary embodiment.

The manufacturing method of the capacitor structure according to the exemplary embodiment includes a step of preparing a first substrate (S100), a step of forming a mask on the first substrate (S200), a step of surface-treating an area of the first substrate (S300), which is exposed without the mask, a step of forming a first electrode part on the surface-treated area of the first substrate (S400), a step of forming a dielectric layer on the first substrate (S500), and a step of forming a second electrode part and a second substrate on the dielectric layer (S600). The first substrate, the second substrate, and the dielectric layer have Poisson's ratios determined by the following Equation 1, and a Poisson's ratio of the first substrate or the second substrate is different from that of the dielectric layer.

$$v = -\varepsilon_a / \varepsilon_b \qquad \text{Equation 1}$$

At this time, v is a Poisson's ratio, $\varepsilon_a$ and $\varepsilon_b$ are length variations in directions a and b, respectively, and each of a and b is any one selected from a first coordinate direction, a second coordinate direction, and a third coordinate direction. Here, a and b are different from each other.

FIGS. 5 and 6A-6D illustrate a portion of the manufacturing method of the capacitor structure according to the present disclosure. According to FIG. 5, the manufacturing method of the capacitor structure includes a step (S100) of preparing a substrate, a step (S200) of forming a mask on the substrate, a step (S300) of surface-treating the substrate, and a step (S400) of forming an electrode after the mask is removed.

Hereinafter, each step will be described in detail.

Figure 6A:
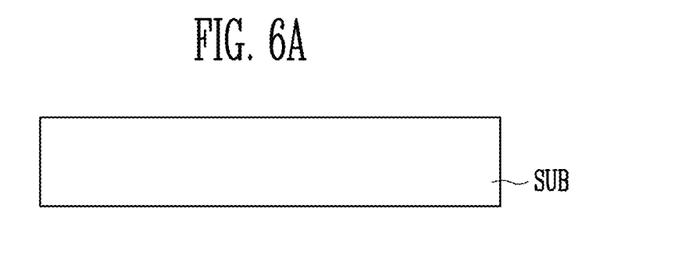
FIGS. 6A, 6B, 6C, and 6D are sectional views sequentially illustrating the manufacturing method of the capacitor structure according to an exemplary embodiment.

Referring to FIG. 6A, a substrate SUB is prepared (S100). The substrate (SUB) may be formed using a material having a Poisson's ratio greater than that of the dielectric layer. The thickness of the substrate SUB may be greater than that of the dielectric layer. The substrate SUB is preferably formed of a material having flexibility. The shape of the substrate SUB is not particularly limited. The shape of the substrate SUB may be changed depending on shapes of the capacitor structure and a device including the same. Although the substrate SUB is illustrated in FIG. 6A, the substrate SUB may be a first substrate and/or a second substrate.

Figure 6B:
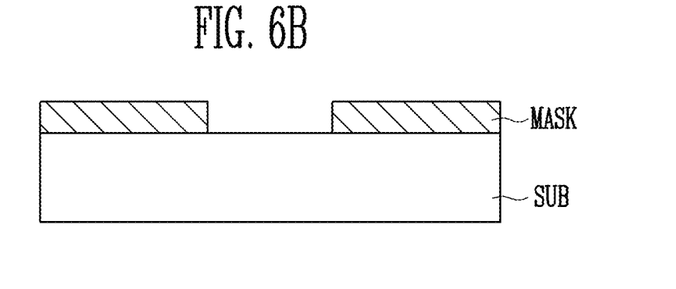

Referring to FIG. 6B, a mask MASK is formed on the substrate SUB (S200). The mask MASK may be formed according to the shape of an electrode to be formed. A portion that is not covered by the mask MASK is an area in which the electrode is formed in a subsequent process. The material constituting the mask MASK is not particularly limited. The mask MASK may be formed in advance and then stacked on the substrate SUB. Alternatively, the mask MASK may be coated on the substrate SUB and then heat-cured or ultraviolet-cured. The material constituting the mask MASK and the shape of the mask MASK may be changed depending on the kind of material included in the substrate SUB and the complexity of an electrode shape to be formed.

Figure 6C:
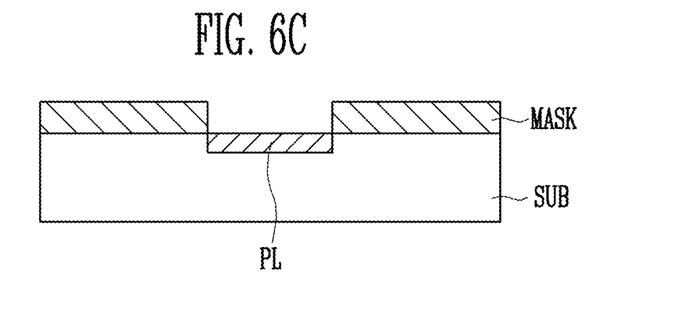

Referring to FIG. 6C, the substrate SUB is surface-treated (S300). At this time, only an exposed area in which the mask MASK is not provided is surface-treated. The surface-treated area PL has properties different from those of an area that is covered by the mask MASK which is not surface-treated. There are different kinds of surface treatments, and there are different objects of performing the surface treatment. For example, the surface treatment may be a treatment for converting a partial surface of the hydrophilic substrate SUB into a hydrophobic surface. On the contrary, the surface treatment may be a treatment for converting a partial surface of the hydrophobic substrate SUB into a hydrophilic surface. The object of the surface treatment may be changed depending on the kind of material included in the substrate SUB.

When the substrate SUB is made of polydimethylsiloxane (PDMS), the surface of the substrate SUB is hydrophobic. In this case, the surface treatment performed on the substrate SUB may be a treatment for converting the surface-treated area PL into a hydrophilic area. An oxygen plasma treatment may be used as an example of the surface treatment. An oxygen-plasma-treated area of the polydimethylsiloxane (PDMS) has a relatively hydrophilic property as compared with the other areas.

Figure 6D:
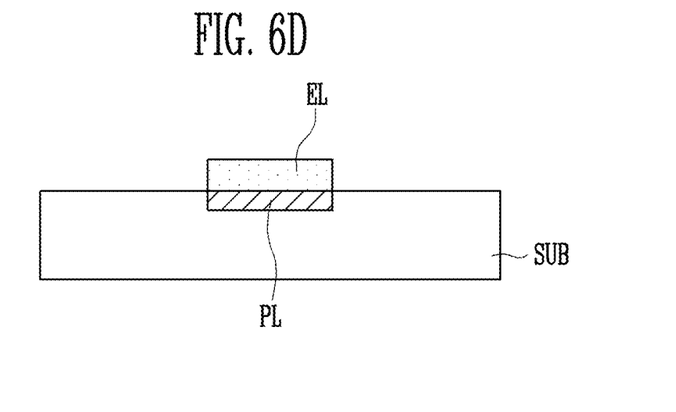

Referring to FIG. 6D, the mask MASK is removed from the substrate SUB, and an electrode part EL is formed (S400). The electrode part EL may be formed on the surface-treated area PL. When the substrate SUB is made of the polydimethylsiloxane (PDMS), the electrode part EL may be formed by mixing a conductive material for forming the electrode part EL with a hydrophilic solution and coating the mixture of the conductive material and the hydrophilic solution on the surface-treated substrate SUB. If the mixture of the conductive material and the hydrophilic solution is coated and then washed, the mixture remains on only the surface-treated area PL having the hydrophilic property and is washed away on the other area. Through such a method, the electrode part EL may be formed on the substrate SUB.

The method of forming an electrode part EL has several advantages. In the conventional art, an electrode part EL is formed on a carrier substrate and then transferred onto a substrate SUB. However, in such a method, the transfer cannot be performed several times when the electrode part EL is formed, and hence it is difficult to form the electrode part EL having a complicated shape. On the other hand, the method of forming the electrode part EL according to the exemplary embodiment is suitable to simply form the electrode part EL having a complicated shape. When an electrode part EL in another layer is further formed on the electrode part EL shown in FIG. 6D, the electrode part EL having a new pattern may be further formed by again stacking a mask on the structure shown in FIG. 6D and performing the surface treatment.

According to exemplary embodiments, the surface-treated area may be an area including a surface-treated area and a peripheral portion thereof. In this case, the peripheral portion may be changed depending on sizes of the substrate SUB and the electrode part EL, but is within a few micrometers from the boundary between the surface-treated area PL and the other areas.

The conductive material may be a wire-shaped conductor. The wire-shaped conductor is the same as described above. If the mixture of the wire-shaped conductor and the hydrophilic solution is coated, the wire-shaped conductor may penetrate into the substrate SUB through the surface of the substrate SUB. Therefore, the wire-shaped conductor may be embedded in the substrate SUB. Since the surface-treated area PL particularly has the hydrophilic property, when the wire-shaped conductor is coated together with a hydrophilic material, the wire-shaped conductor may easily penetrate into the substrate SUB. In FIG. 6D, it is illustrated that the interface between the electrode part EL and the surface-treated area PL is a flat surface. However, the shape of the electrode part EL is not limited by the drawing, and the interface between the electrode part EL and the surface-treated area PL may have a shape in which the wire-shaped conductor is inserted into the surface-treated area PL to be tangled.

After a first electrode part and a second electrode part are respectively formed on a first substrate and a second substrate by using the above-described method, a dielectric layer may be stacked between the first substrate and the second substrate. The staking of the dielectric layer may be performed by injecting the dielectric layer between the first substrate and the second substrate in a state in which the first substrate and the second substrate face each other. Alternatively, the stacking of the dielectric layer may be performed by stacking the dielectric layer on the first substrate through coating, printing, or application and then stacking the dielectric layer on the second substrate. Those skilled in the art may form the dielectric layer, using various methods known in the art, according to properties of the dielectric layer.

According to the exemplary embodiments, the capacitor structure can be applied to various display devices. Such a display device includes the capacitor structure according to the exemplary embodiments and a display unit for displaying an image. The capacitor structure in the display device may be used in a touch panel for recognizing a touch of a user or a transistor for assisting driving the display device. For example, when the capacitor structure is used in the touch panel, the capacitor structure may be included in a touch sensing unit capable of recognizing a touch of a user. In addition, when the capacitor structure is used in the transistor for helping driving of the display device, the capacitor structure may be included in a transistor for driving the display device.

According to the exemplary embodiments, the capacitance of the capacitor is constantly maintained even when the shape of the capacitor structure is changed by external strain.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A capacitor structure, comprising:
   a first substrate, wherein the first substrate comprises a first electrode part disposed on one surface of the first substrate;
   a second substrate, wherein the second substrate comprises a second electrode part disposed on a surface of the second substrate, the surface of the second substrate faces the first substrate; and
   a dielectric layer disposed between the first substrate and the second substrate,
   wherein a Poisson's ratio of the first substrate or the second substrate is at least 0.2 greater than a Poisson's ratio of the dielectric layer, and
   wherein a thickness of the dielectric layer is less than a thickness of the first substrate and less than a thickness of the second substrate.

2. The capacitor structure of claim 1, wherein the first substrate, the second substrate, and the dielectric layer are contracted or stretched in a first coordinate direction, a second coordinate direction, and a third coordinate direction.

3. The capacitor structure of claim 2, wherein a shape change of the dielectric layer in the third coordinate direction with respect to a strain applied in the first coordinate direction or the second coordinate direction is smaller than a shape change of the dielectric layer in the first coordinate direction or a shape change of the dielectric layer in the second coordinate direction.

4. The capacitor structure of claim 2, wherein the first coordinate direction, the second coordinate direction, and the third coordinate direction constitute a coordinate system selected from a group consisting of a Cartesian coordinate system, a cylindrical coordinate system, and a spherical coordinate system.

5. The capacitor structure of claim 1, wherein the first electrode part is embedded in the first substrate and the second electrode part is embedded in the second substrate.

6. The capacitor structure of claim 5, wherein the first electrode part and the second electrode part further comprise a wire-shaped conductor.

7. The capacitor structure of claim 1, wherein surfaces of the first substrate and the second substrate are hydrophobic.

8. A display device comprising:
   the capacitor structure of claim 1; and
   a display unit configured to display an image.

9. The display device of claim 8, further comprising a touch sensing unit configured to recognize a touch of a user, wherein the capacitor structure is disposed in the touch sensing unit.

10. The display device of claim 8, further comprising a transistor for driving the display device, wherein the capacitor structure is disposed in the transistor.

11. A method of manufacturing a capacitor structure, the method comprising:
    preparing a first substrate;
    forming a mask on the first substrate;
    surface-treating an area of the first substrate, which is exposed without the mask;
    forming a first electrode part on the surface-treated area of the first substrate;
    forming a dielectric layer on the first substrate; and forming a second electrode part and a second substrate on the dielectric layer, wherein a Poisson's ratio of the first substrate or the second substrate is at least 0.2 greater than a Poisson's ratio of the dielectric layer, and wherein a thickness of the dielectric layer is less than a thickness of the first substrate and less than a thickness of the second substrate.

12. The method of claim 11, wherein the surface-treated area of the first substrate is hydrophilic, and another area of the first substrate, which is not surface-treated, is hydrophobic.

13. The method of claim 11, wherein the first electrode part is formed by coating a hydrophilic resin composition on the first substrate.

14. The method of claim 13, wherein the hydrophilic resin composition comprises a wire-shaped conductor.

15. The method of claim 11, wherein the surface-treating further comprises oxygen-plasma treating the first substrate.

16. The method of claim 11, wherein the forming of the second electrode part and the second substrate comprises:

forming a mask on the second substrate;

surface-treating an area of the second substrate, which is exposed without the mask; and forming the second electrode part on the surface-treated area of the second substrate.

\* \* \* \* \*